United States Patent
AP et al.

(10) Patent No.: US 12,107,804 B2
(45) Date of Patent: Oct. 1, 2024

(54) CHATBOT DYNAMIC CONTENT VIA A SEPARATE MESSAGING APPLICATION

(71) Applicant: ServiceNow, Inc., Santa Clara, CA (US)

(72) Inventors: Gowthaman AP, Bengaluru (IN); Pritika Singh, Bengaluru (IN); Husain Akil Merchant, Pune (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/994,793

(22) Filed: Nov. 28, 2022

(65) Prior Publication Data
US 2024/0179108 A1    May 30, 2024

(51) Int. Cl.
*H04L 51/02* (2022.01)
*G06F 3/0482* (2013.01)
*G06F 3/0483* (2013.01)
*G06F 40/35* (2020.01)

(52) U.S. Cl.
CPC ............ *H04L 51/02* (2013.01); *G06F 3/0483* (2013.01); *G06F 40/35* (2020.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 2014/0282229 | A1* | 9/2014 | Laukkanen | G06F 3/1454 715/788 |
| 2017/0250930 | A1* | 8/2017 | Ben-Itzhak | G06F 3/0488 |
| 2018/0332042 | A1* | 11/2018 | Yu | H04L 67/02 |
| 2022/0385601 | A1* | 12/2022 | Jung | H04L 51/04 |

OTHER PUBLICATIONS

Greyling, Cobus. "The Future of Chatbots with Web 3.0," posted at <https://cobusgreyling.medium.com/the-future-of-chatbots-with-web-3-0-346370a20748>. Oct. 13, 2021 (Year: 2021).*

"Is it possible to specify apps in Dynamic URLs in Unified Interface (v91)" posted at https://community.dynamics.com/forums/thread/details/?threadid=7b9d7a60-2309-4669-9554-d2a6c2f21532. Apr. 5, 2019 (Year: 2019).*

* cited by examiner

*Primary Examiner* — Scott B Christensen
(74) *Attorney, Agent, or Firm* — Van Pelt, Yi & James LLP

(57) ABSTRACT

It is determined that a virtual agent associated with a first party is to provide, via a messaging application, content to a second party. In response to determining that the virtual agent is to provide the content to the second party, a reference to the content is generated, wherein the reference includes a dynamic portion. In response to receiving a request that includes the reference, the content is retrieved using at least a portion of the dynamic portion. The content is provided to the messaging application for display within a window of the messaging application.

20 Claims, 6 Drawing Sheets

| Nowbot Chat Files Your Hub Help About | |
|---|---|
| KB0057030 — 210 | ⏗ Copy Permalink [Subscribe] [...] |

Our new world of work (future of work)
Krista Calvo • 27d ago • 59926 Views

Employees at ServiceNow have more flexibility to choose when to work from a ServiceNow workplace or from a different location, helping to blend work-life responsibilities and business priorities more effectively!

Here are some highlights from our distributed and flexible world of work:

- No mandated days or schedules. Most employees assigned to a workplace location will come in 3 or fewer days per week (or more if personally preferred), maximizing time together when it matters most.
- 30-day work from anywhere benefit. Beginning January 1, 2022, most of our employees will be allowed to work anywhere in the country of their employment, or from a country where they hold citizenship (if different from the country of their employment), for up to 30 calendar days (consecutive or non-consecutive) each year. Get more details here.
- Embracing diversity, equity, and inclusion – no matter where you get the job done. ServiceNow treats all employees fairly and equitably and evaluates everyone using the same criteria, regardless of where they work.

Work personas
Work personas provide guidance for employees based on the nature of their work and assigned work locations. Employees assigned to a ServiceNow workplace location will continue to work from that location in a flexible work persona, unless their situation has changed, and their work warrants a change.

Employees will fall into one of three categories:

| Flexible | Remote | Required in office |
|---|---|---|
| • Assigned to a ServiceNow-affiliated workplace<br>• Works from assigned workplace three or less days/week | • Not assigned to a ServiceNow-affiliated workplace<br>• Must work within state, province, region, or country of employment | • Assigned to a ServiceNow-affiliated workplace<br>• Work from assigned workplace 5 days/week |

212

FIG. 3

CHATBOT DYNAMIC CONTENT VIA A SEPARATE MESSAGING APPLICATION

BACKGROUND OF THE INVENTION

In various circumstances, a messaging application enables a user to communicate with a virtual agent. For example, the virtual agent receives an input (e.g., a text inquiry) from the user, and accordingly generates content that addresses the input. In some situations, the messaging application provides a link to the content. However, the linked content may not be displayable within a window of the messaging application. For example, a security protocol may prohibit display of the underlying content within the window of the messaging application.

BRIEF DESCRIPTION OF THE DRAWINGS

Various embodiments of the invention are disclosed in the following detailed description and the accompanying drawings.

FIG. 3 illustrates an example of linked content displayed within a messaging application window.

DETAILED DESCRIPTION

Figure 1:
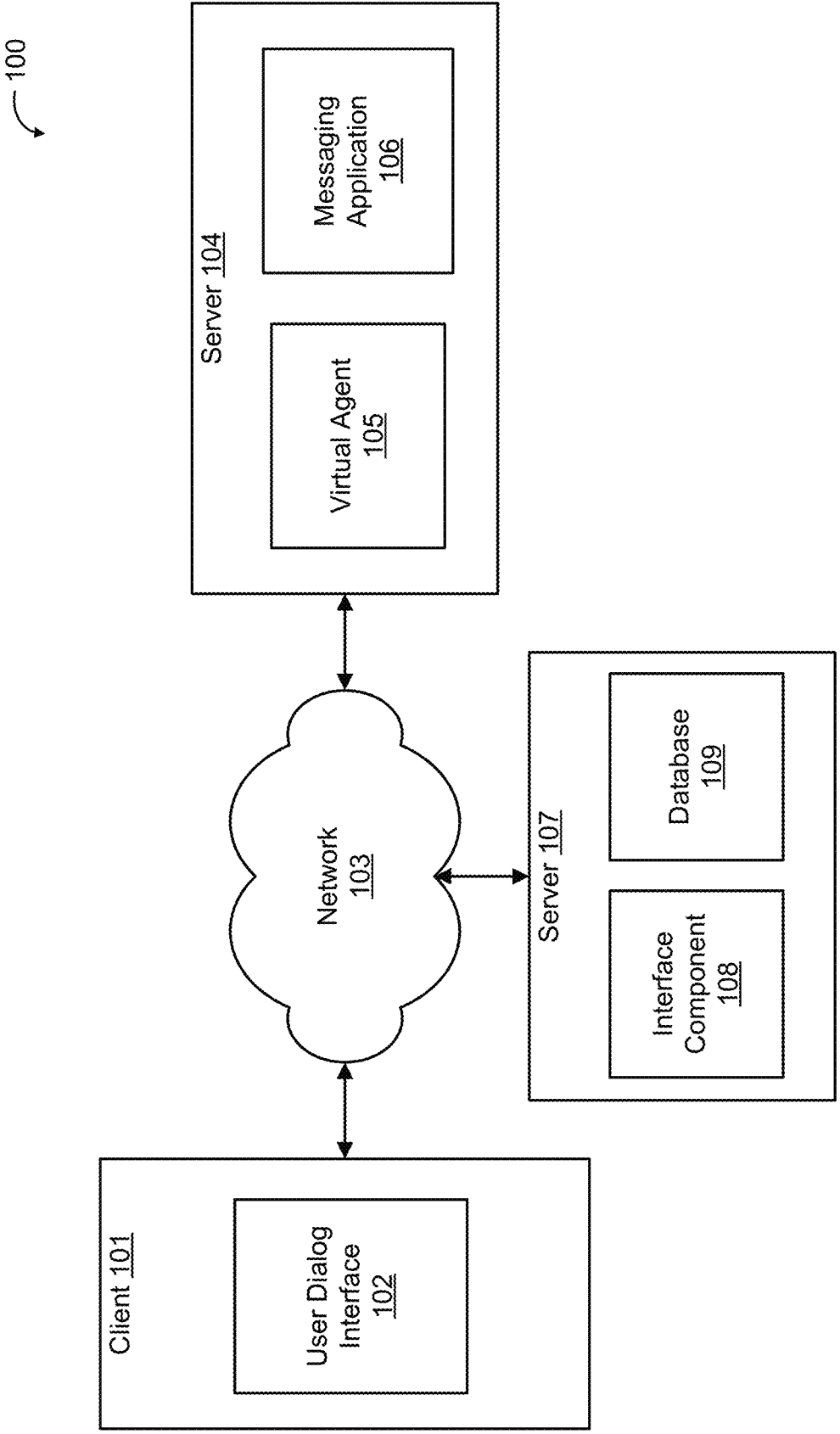
FIG. 1 is a block diagram illustrating an embodiment of a system for providing dynamic chat content.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Chatbot dynamic content via a separate messaging application is disclosed. It is determined that a virtual agent associated with a first party is to provide, via a messaging application, content to a second party. In response to determining that the virtual agent is to provide the content to the second party, a reference to the content is generated, wherein the reference includes a dynamic portion. In response to receiving a request that includes the reference, the content is retrieved using at least a portion of the dynamic portion. The content is provided to the messaging application for display within a window of the messaging application.

The techniques disclosed herein allow a virtual agent (e.g., chatbot) to present to a user linked content that can be opened within a conversation platform used by the virtual agent and the user. The user is able to open links within a messaging application during a conversation with the virtual agent without navigating to an external application such as a browser. The techniques disclosed herein provide the ability to display content external to the messaging application dynamically and users to view external links in a tab or window of the message application without any extra authentication and navigation to a browser, which provides a faster, more efficient, and more convenient experience for users conversing with virtual agents.

In various embodiments, virtual agent (e.g., chatbot) content is displayed in a messaging application. In various embodiments, chatbot software is integrated into the messaging application. The messaging application may be developed by a third party that is unrelated to the developer of the chatbot software. In various embodiments, the messaging application operates as a computer application (e.g., on a desktop or laptop computer). A user of the messaging application can have a conversation with a chatbot. The user can view text generated by the chatbot within the messaging application. However, prior approaches are deficient because the user is not able to access linked content, e.g., content pointed to by a Uniform Resource Locator (URL) link, within the messaging application. For example, there may be computer security reasons why the linked content does not appear directly in the messaging application (e.g., appears instead in a web browser outside of the messaging application when the user clicks on the link provided by the chatbot). It would be desirable to have the linked content appear directly in the messaging application.

In various embodiments, a solution to the problem described above is to use a type of content linking mechanism that allows for invocation of a window/tab directly in the messaging application. As used herein, the term "window" encompasses the term "tab". As used herein, any technique that contemplates use of a window also contemplates use of a tab. A window refers to a display area in a graphical user interface. A tab refers to a display area that is accessed by clicking on a specified area near the top of a window such that when the specified area is clicked, content associated with the specified area is shown. The specified area itself may also be referred to as the "tab". Multiple tabs can exist, meaning multiple content areas can be simultaneously open. However, only one tab is displayed at a time, and other open tabs are hidden. Tabs allow for rapid switching between content. The content linking mechanism described herein allows a chatbot to pass a URL and additional information. In various embodiments, the URL is referred to as a static portion, and the additional information is referred to as a dynamic portion. Information that is part of the dynamic portion can include an identifier that serves as an authentication mechanism. In this manner, the chatbot can be authenticated to the messaging application so that a content link provided by the chatbot can be trusted and allowed to open in the messaging application. In various embodiments, the dynamic portion includes database and/or table lookup parameters. The static portion may link to a software interface component that interfaces with a database or other data storage structure. In this scenario, the dynamic portion may include an identifier (e.g., a unique identifier) for a specific content item to be passed to the software interface component so that the software interface component can locate the specific content item in the database or other data storage structure. Different databases and/or tables may exist for different tasks. Thus, the dynamic portion may also include a database and/or table identifier.

FIG. 1 is a block diagram illustrating an embodiment of a system for providing dynamic chat content. In the example shown, system 100 includes client 101, user dialog interface 102, network 103, server 104, virtual agent 105, messaging application 106, server 107, interface component 108, and database 109. In some embodiments, client 101 is a computer (e.g., desktop or laptop computer) or other hardware device that a user (e.g., a human) utilizes to engage in a dialog with a virtual agent. In the example illustrated, user dialog interface 102 resides on client 101. In some embodiments, user dialog interface 102 includes graphical user interface components for the user to input text, wherein the text is comprised of natural language strings.

In the example illustrated, client 101, server 104, and server 107 are communicatively connected via network 103. Text inputted by a user can be transmitted to server 104 using network 103. Server 104 can access data on server 107 using network 103. Examples of network 103 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, servers 104 and 107 include computer or other hardware components. In the example illustrated, virtual agent 105 resides on server 104. In some embodiments, virtual agent 105 receives text from a user and transmits text back to the user. Virtual agent 105 may include a hardware storage component (e.g., a hard drive for message storage). In various embodiments, virtual agent 105 is communicatively connected to messaging application 106. For example, virtual agent 105 may be integrated (e.g., as a plug-in or another type of software component) into messaging application 106. In some embodiments, user dialog interface 102 includes an instance of messaging application 106. In some embodiments, user dialog interface 102 utilizes a persistent chat channel of messaging application 106 to transmit and receive text between a user of client 101 and virtual agent 105 of server 104. In various embodiments, client 101, server 104, and/or server 107 are programmed computer systems.

Figure 2:
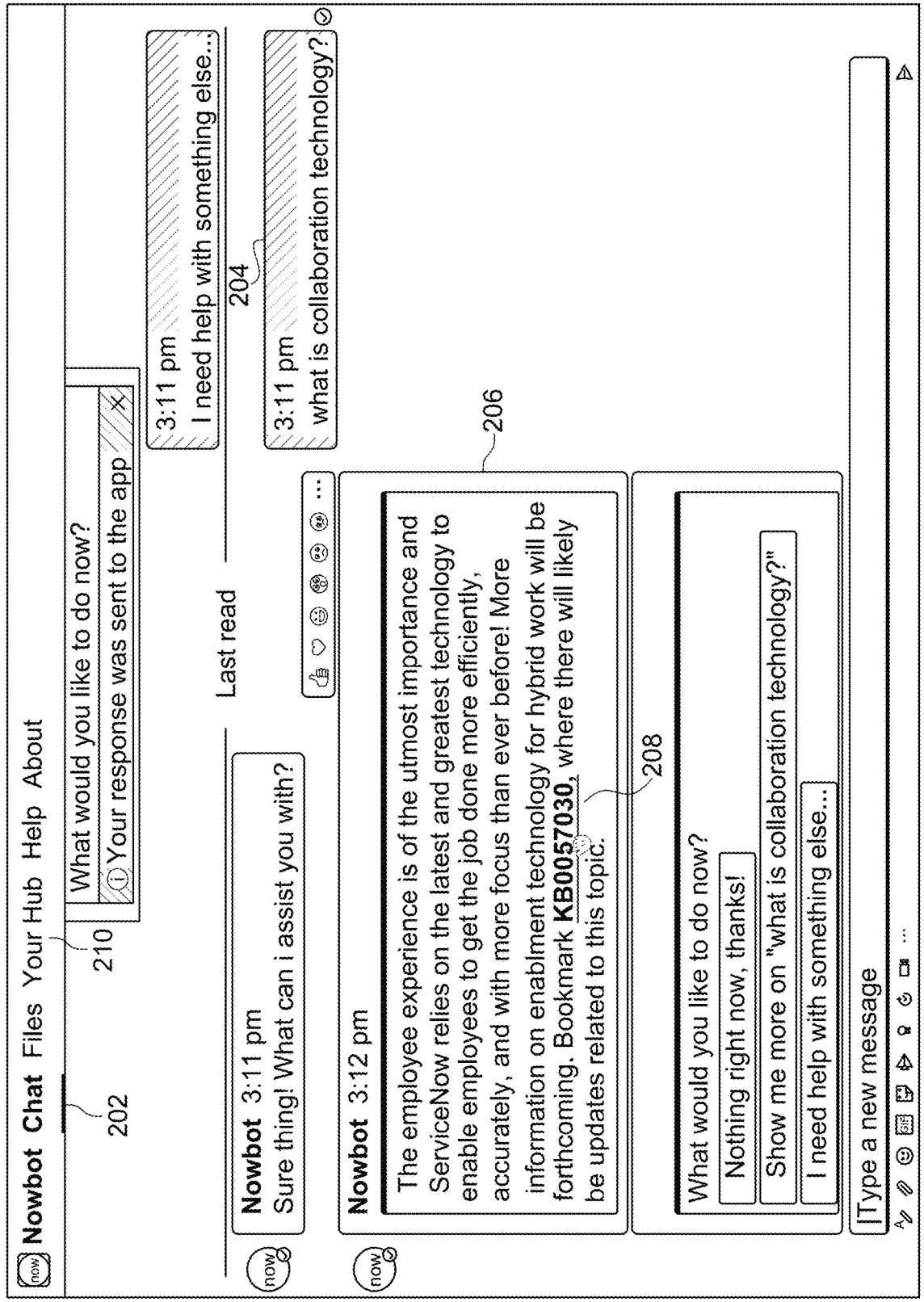
FIG. 2 illustrates an example of a dynamic link within a chat window.

In the example illustrated, messaging application 106 resides on server 104. In various embodiments, messaging application 106 provides chat/dialogue functionality. FIG. 2 illustrates an example dialogue that includes presentation of a link from a chatbot to a user. In the example shown in FIG. 2, a chat is active as indicated by the content shown under chat tab 202. FIG. 2 shows chat content within a window of a messaging application. In the example shown, the chat involves a conversation between a virtual agent and a human user. For example, text 204 is text input from the user asking about technology for employee collaboration. Text 206 includes a response from the virtual agent regarding technology that employees can utilize to work more efficiently. Within text 206 is link 208 to data content that provides additional information regarding collaboration technology. The user can click on link 208 to see the data content within a window of the messaging application. Specifically, the data content appears under tab 210 (e.g., see FIG. 3). In some embodiments, the user corresponds to client 101 of FIG. 1, and the virtual agent corresponds to virtual agent 105 of FIG. 1. In some embodiments, the messaging application is messaging application 106 of FIG. 1.

In some embodiments, link 208 is a URL link. Stated alternatively, in some embodiments, link 208 uses the URL format. In various embodiments, link 208 has a static portion and a dynamic portion. An example URL with such a format is: "https://application.domain.com/<static portion>/<dynamic portion>. Various other link formats can also be utilized. The static portion may include an address of a table, database, other data structure, or a website for the table, database, or other data structure, and the dynamic portion may include lookup parameters (e.g., for a specific content item) for the table, database, or other data structure. Various types of content items may be requested. For example, articles, records, catalog items, search results, images, other media, or other types of data may be requested. In the example shown in FIG. 2, a specific article (KB0057030) is requested. Thus, the static portion may specify the database where KB0057030 is located, and the dynamic portion may specify an identifier for article KB0057030 (e.g., the text "KB0057030" itself). In some embodiments, different tables, databases, or other data structures are utilized for different tasks. Thus, the dynamic portion may be needed to disambiguate these different sources. In some embodiments, the static portion links to an interface component for the table, database, or other data structure. For example, the interface component may be interface component 108 of FIG. 1.

In the example shown in FIG. 1, interface component 108 resides on a server (server 107) that is separate from but communicatively connected to the server hosting the messaging application (on server 104). In some embodiments, interface component 108 is included in cloud-based software. For example, interface component 108 may be a component of a cloud-based user interface that enables users to access data and services. In various embodiments, interface component 108 is utilized to access database 109. In some embodiments, the data content associated with link 208 of FIG. 2 is stored in database 109. In various embodiments, after the user clicks on link 208, the data content is displayed in a tab of the messaging application that is different from the chat tab. For example, after the user clicks on link 208, the data content may appear under tab 210 of FIGS. 2 and 3. FIG. 3 illustrates data content 212 appearing under tab 210. Chat tab 202 and tab 210 belong to a common messaging application. Thus, the user is able to switch between viewing a chat dialogue under chat tab 202 and data content 212 associated with link 208 under tab 210 in the common messaging application. The user is not required to view data content 212 in an external web browser or perform additional authentication. In the example shown in FIG. 3, data content 212 is a text article describing remote work policies corresponding to the chat dialogue shown in FIG. 2.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. The components are not necessarily located in the same geographic location. Components not shown in FIG. 1 may also exist.

FIG. 2 illustrates an example of a dynamic link within a chat window. FIG. 2 is described in detail above in the description associated with FIG. 1.

FIG. 3 illustrates an example of linked content displayed within a messaging application window. FIG. 3 is described in detail above in the description associated with FIG. 1.

Figure 4:
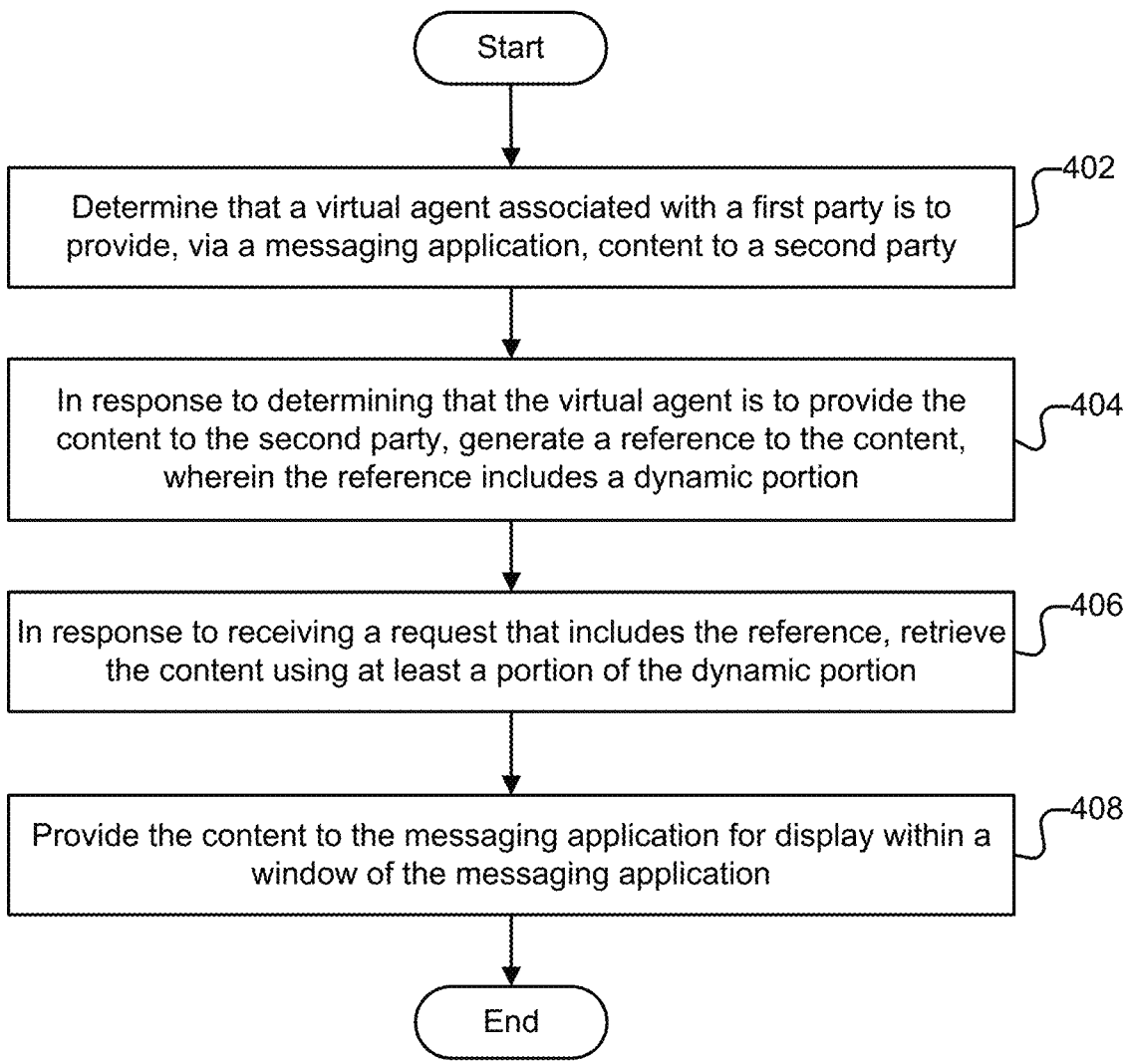
FIG. 4 is a flow diagram illustrating an embodiment of a process for providing dynamic chat content.

FIG. 4 is a flow diagram illustrating an embodiment of a process for providing dynamic chat content. In some embodiments, the process of FIG. 4 is performed by server 104 of FIG. 1.

At 402, it is determined that a virtual agent associated with a first party is to provide, via a messaging application, content to a second party. In some embodiments, the virtual agent is virtual agent 105 of FIG. 1. In some embodiments, the messaging application is messaging application 106 of FIG. 1. In some embodiments, the first and second parties are associated with server 104 and client 101, respectively, of FIG. 1. The content may be in response to a user request or search. In various embodiments, the content is located in a network location from which the content must be retrieved. Stated alternatively, in various embodiments, the content is not immediately available to the virtual agent or messaging application such that the content can be immediately provided to the second party.

At 404, in response to determining that the virtual agent is to provide the content to the second party, a reference to the content is generated, wherein the reference includes a dynamic portion. In some embodiments, the reference has a URL link format. In various embodiments, the reference refers to a network/Internet location from which the content can be retrieved. In various embodiments, the reference also includes a static portion, wherein the static portion indicates a general location from which the content can be retrieved. For example, the static portion may be an address of a database, table, or other data structure or an interface (e.g., a web-based interface) for accessing the database, table, or other data structure. In various embodiments, the static portion and the dynamic portion are utilized together to locate the content. For example, the dynamic portion may indicate an identifier for the content in the database, table, or other data structure indicated by the static portion. In various embodiments, the reference (e.g., in a link format) is provided by the virtual agent, via the messaging application, to the second party (e.g., link 208 of FIG. 2).

At 406, in response to receiving a request that includes the reference, the content is retrieved using at least a portion of the dynamic portion. In various embodiments, the second party requests the content by interacting with (e.g., clicking on) a user interface representation of the reference. For example, in FIG. 2, a user can click on link 208. In various embodiments, the dynamic portion identifies the content that is retrieved. For example, the dynamic portion may include a lookup parameter for the content in database 109 of FIG. 1. The dynamic portion may be processed by interface component 108 of FIG. 1 in order to retrieve the content from database 109 (e.g., interface component 108 uses a lookup parameter, such as an identifier of the content, to locate the content).

At 408, the content is provided to the messaging application for display within a window of the messaging application. The content is not displayed in a browser window external to the messaging application. In some embodiments, the content is displayed within a tab of the window that is different from another tab in which dialogue between the virtual agent and the second party is displayed. For example, data content 212 is displayed under tab 210 of FIG. 3, which is different from chat tab 202 of FIG. 2.

Figure 5:
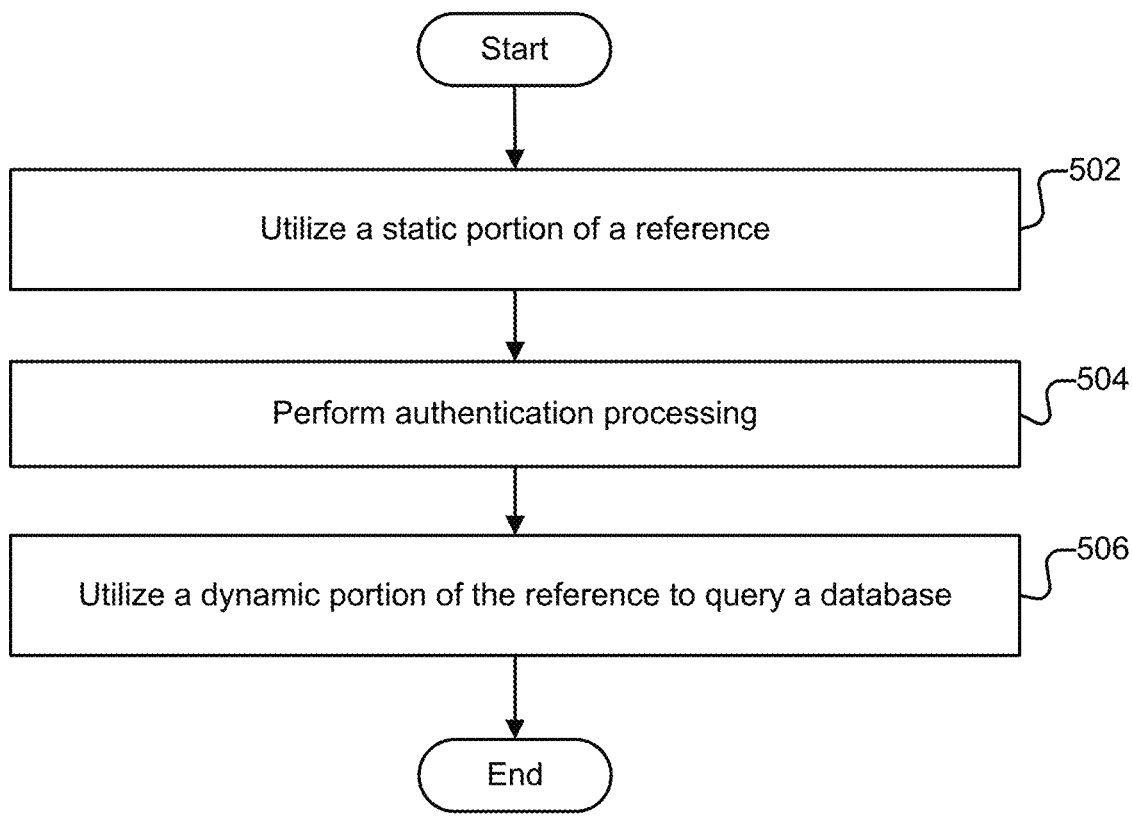
FIG. 5 is a flow diagram illustrating an embodiment of a process for retrieving content using a reference that includes a dynamic portion.

FIG. 5 is a flow diagram illustrating an embodiment of a process for retrieving content using a reference that includes a dynamic portion. In some embodiments, the process of FIG. 5 is performed by server 104 of FIG. 1. In some embodiments, the process of FIG. 5 is performed at least in part in 406 of FIG. 4.

At 502, a static portion of a reference is utilized. In some embodiments, a linked URL includes details regarding an application identifier and a tab identifier. Hence, after a link is clicked by a user, the user may be redirected to that particular application and tab.

At 504, authentication processing is performed. In some embodiments, after the tab is invoked, the messaging application sends user and application details as a token (e.g., a JavaScript Object Notation (JSON) web token) to an authentication server for authentication.

At 506, a dynamic portion of the reference is utilized to query a database. In various embodiments, after authentication is performed, a request is redirected to an interface component (e.g., interface component 108 of FIG. 1). The interface component can utilize the dynamic portion to query the database to retrieve content to display to the user.

Figure 6:
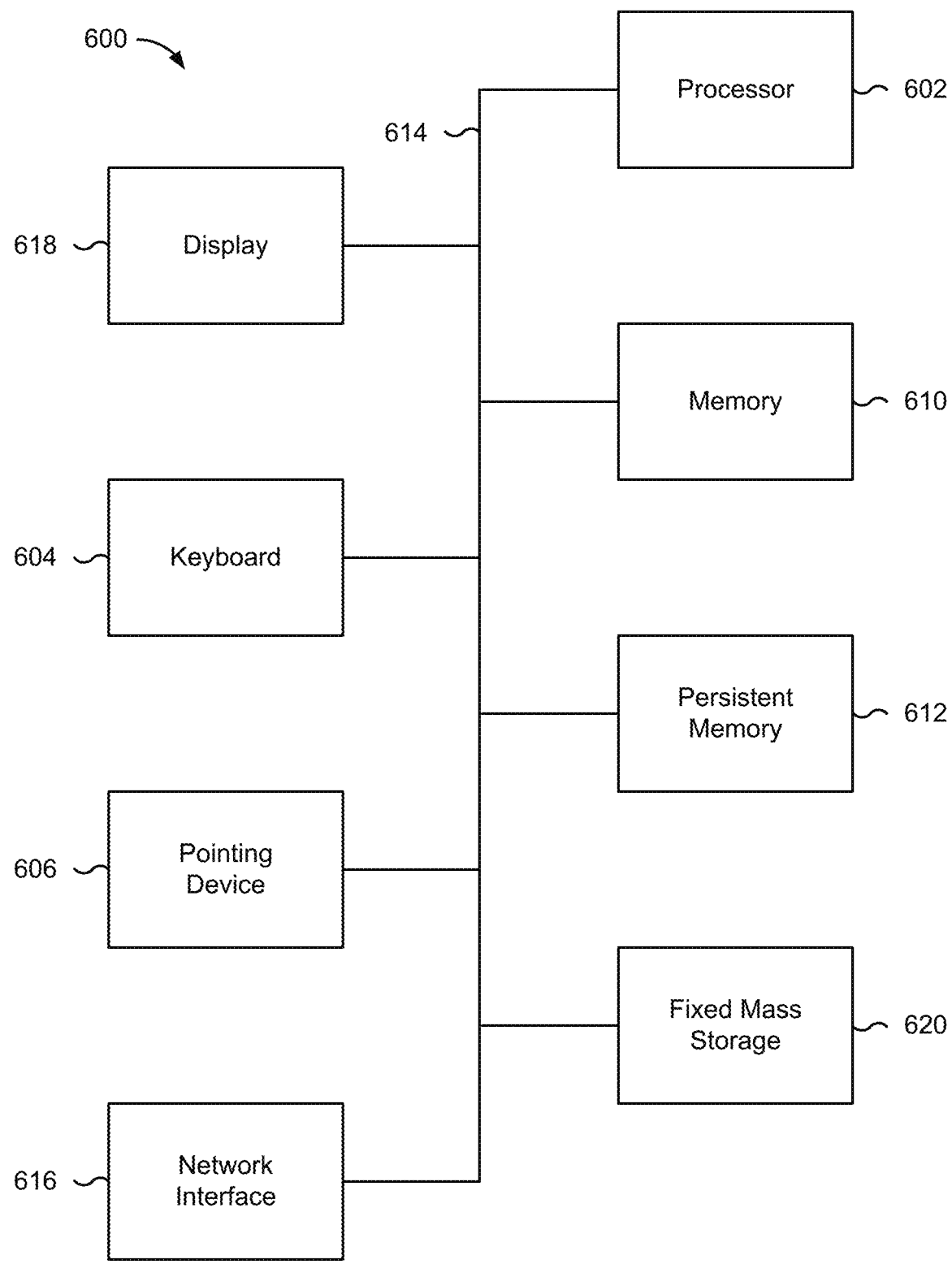
FIG. 6 is a functional diagram illustrating a programmed computer system.

FIG. 6 is a functional diagram illustrating a programmed computer system. In some embodiments, the processes of FIGS. 4 and/or 5 are executed by computer system 600. Computer system 600 is an example of a processor. In some embodiments, computer system 600 is included in client 101, server 104, and/or server 107 of FIG. 1.

In the example shown, computer system 600 includes various subsystems as described below. Computer system 600 includes at least one microprocessor subsystem (also referred to as a processor or a central processing unit (CPU)) 602. Computer system 600 can be physical or virtual (e.g., a virtual machine). For example, processor 602 can be implemented by a single-chip processor or by multiple processors. In some embodiments, processor 602 is a general-purpose digital processor that controls the operation of computer system 600. Using instructions retrieved from memory 610, processor 602 controls the reception and manipulation of input data, and the output and display of data on output devices (e.g., display 618).

Processor 602 is coupled bi-directionally with memory 610, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also, as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

Persistent memory 612 (e.g., a removable mass storage device) provides additional data storage capacity for computer system 600, and is coupled either bi-directionally (read/write) or uni-directionally (read only) to processor 602. For example, persistent memory 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Persistent memory 612 and fixed mass storage 620 generally store additional programming instructions, data, and the like that typically are not in active use by the processor 602. It will be appreciated that the information retained within persistent memory 612 and fixed mass storages 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, pointing device 606 can be a mouse, stylus, track ball, or tablet, and is useful for interacting with a graphical user interface.

Network interface 616 allows processor 602 to be coupled to another computer, computer network, or telecommunications network using a network connection as shown. For example, through network interface 616, processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect computer system 600 to an external network and transfer data according to standard protocols. Processes can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, by a first party associated with a virtual agent involved in a chat session with a second party, that the virtual agent associated with the first party is to provide, via a messaging application, content to the second party;
   in response to determining that the virtual agent is to provide the content to the second party, generating by the first party associated with the virtual agent a reference to the content for display by the message application as web content instead of by a separate web browser application, wherein a dynamic portion included in the reference generated by the first party includes information for assisting in a retrieval of the content associated with the reference and an application identifier of the message application to cause the messaging application of the second party to display the content instead of the separate web browser application configured to otherwise display the web content when referenced without the application identifier of the message application;
   in response to receiving, from the second party, a request that includes the reference, retrieving, by the first party, the content using at least a portion of the dynamic portion; and
   providing, by the first party, the content to the messaging application for display within a second tab or window different from a first tab or window of the messaging application based on the application identifier identifying the messaging application, wherein the virtual agent is provided in the first tab or window dedicated to providing the virtual agent such that the first tab or window providing the virtual agent does not function as a separate general purpose web browser.

2. The method of claim 1, wherein the reference includes a static portion.

3. The method of claim 2, wherein the static portion includes a Uniform Resource Locator (URL) indicating an address of an interface component configured to receive the dynamic portion.

4. The method of claim 1, wherein the dynamic portion includes one or more lookup parameters associated with one or more databases.

5. The method of claim 1, wherein the virtual agent corresponds to a chatbot.

6. The method of claim 1, wherein the determination that the virtual agent is to provide the content is in response to receiving an indication that the second party requests the content.

7. The method of claim 1, wherein the virtual agent utilizes a persistent chat channel of the messaging application.

8. The method of claim 1, wherein the messaging application is a desktop or laptop computing application.

9. The method of claim 1, wherein the window is accessible by selecting a specified area at a portion of a user interface display.

10. The method of claim 1, wherein the virtual agent is integrated into the messaging application.

11. The method of claim 1, wherein retrieving the content using at least the portion of the dynamic portion includes transmitting at least the portion of the dynamic portion to an interface software component associated with a database.

12. The method of claim 11, wherein the interface software component queries the content in the database.

13. The method of claim 1, wherein the content is stored in a table data structure.

14. The method of claim 1, wherein the dynamic portion includes a unique identifier for the content.

15. The method of claim 1, wherein the content is stored in a network location that is different from a server executing the messaging application.

16. The method of claim 1, wherein the reference includes authentication information associated with the virtual agent.

17. The method of claim 1, wherein the dynamic portion includes an identifier of a type of database, table, or other data storage structure corresponding to the content.

18. The method of claim 1, wherein the reference includes an identifier of the second tab or window of the messaging application where the content is to be displayed.

19. A system, comprising:
one or more processors configured to:
determine, by a first party associated with a virtual agent involved in a chat session with a second party, that the virtual agent associated with the first party is to provide, via a messaging application, content to the second party;
in response to determining that the virtual agent is to provide the content to the second party, generate by the first party associated with the virtual agent a reference to the content for display by the message application as web content instead of by a separate web browser application, wherein a dynamic portion included in the reference generated by the first party includes information for assisting in a retrieval of the content associated with the reference and an application identifier of the message application to cause the messaging application of the second party to display the content instead of the separate web browser application configured to otherwise display the web content when referenced without the application identifier of the message application;
in response to receiving, from the second party, a request that includes the reference, retrieve, by the first party, the content using at least a portion of the dynamic portion; and
provide, by the first party, the content to the messaging application for display within a second tab or window different from a first tab or window of the messaging application based on the application identifier identifying the messaging application, wherein the virtual agent is provided in the first tab or window dedicated to providing the virtual agent such that the first tab or window providing the virtual agent does not function as a separate general purpose web browser; and
a memory coupled to at least one of the one or more processors.

20. A computer program product embodied in a non-transitory computer readable medium and comprising computer instructions for:
determining, by a first party associated with a virtual agent involved in a chat session with a second party, that the virtual agent associated with the first party is to provide, via a messaging application, content to the second party;
in response to determining that the virtual agent is to provide the content to the second party, generating by the first party associated with the virtual agent a reference to the content for display by the message application as web content instead of by a separate web browser application, wherein a dynamic portion included in the reference generated by the first party includes information for assisting in a retrieval of the content associated with the reference and an application identifier of the message application to cause the messaging application of the second party to display the content instead of the separate web browser application configured to otherwise display the web content when referenced without the application identifier of the message application;
in response to receiving, from the second party, a request that includes the reference, retrieving, by the first party, the content using at least a portion of the dynamic portion; and
providing, by the first party, the content to the messaging application for display within a second tab or window different from a first tab or window of the messaging application based on the application identifier identifying the messaging application, wherein the virtual agent is provided in the first tab or window dedicated to providing the virtual agent such that the first tab or window providing the virtual agent does not function as a separate general purpose web browser.

* * * * *